United States Patent

[11] 3,631,709

| [72] | Inventors | Edward C. Smith<br>Madison;<br>Carl P. Kimball, Cromwell, both of Conn. |
|---|---|---|
| [21] | Appl. No. | 25,783 |
| [22] | Filed | Apr. 6, 1970 |
| [45] | Patented | Jan. 4, 1972 |
| [73] | Assignee | Neptune Meter Company<br>New York, N.Y. |

[54] HIGH-SPEED CALIBRATION OF LIQUID FLOW METERS
13 Claims, 7 Drawing Figs.

| [52] | U.S. Cl. | 73/3 |
|---|---|---|
| [51] | Int. Cl. | G01f 25/00 |
| [50] | Field of Search | 73/3, 195 |

[56] References Cited
UNITED STATES PATENTS

| 1,434,198 | 10/1922 | Calhoun | 73/3 |
|---|---|---|---|
| 3,016,731 | 1/1962 | Hirsch | 73/3 |
| 3,469,442 | 9/1969 | Brueckner | 73/3 X |

*Primary Examiner*—Louis R. Prince
*Assistant Examiner*—William A. Henry, II
*Attorneys*—Lester W. Clark, Robert S. Dunham, P. E. Henninger, Gerald W. Griffin, Thomas F. Moran, R. Bradlee Boal, Christopher C. Dunham, Robert Scobey and Ivan S. Kavrukov

ABSTRACT: High-speed concurrent calibration of a plurality of liquid flow meters connected in series is carried out at several different flow rates. Each meter drives a register through a reduction gear. Meters which cannot be corrected to acceptable registration range by selection among available reduction gears having different gear ratios are rejected; an optimum gear ratio is selected for each of the accepted meters.

The registration of each meter is measured at each of three separate flow rates established and maintained by a hydraulic system during three successive phases of a single stroke of the piston of a hydraulic cylinder driven by an electric motor under programmed control. The three measured registrations for each meter are combined electronically to indicate if the meter can be brought within an acceptable registration range at all three flow rates by one of several available gear ratios; one of the measured registrations is used to determine which of several available gear ratios brings the meter closest to, but not above, a predetermined registration range.

A particular embodiment of the invention is useful in similarly calibrating a single gas meter at a time.

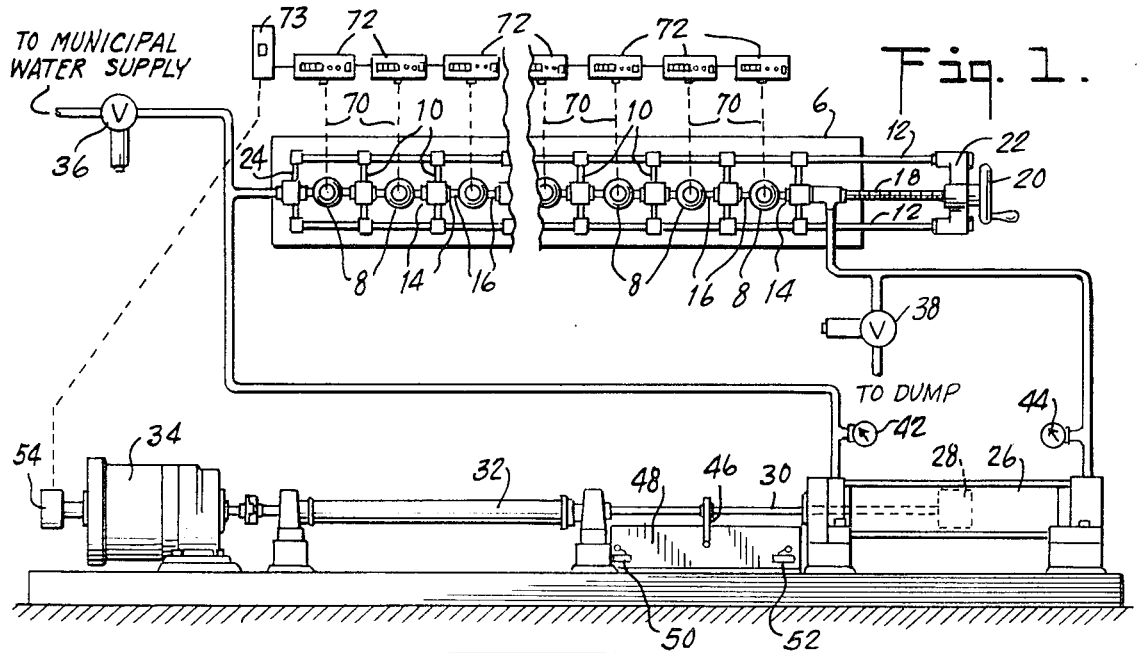
Fig. 1.
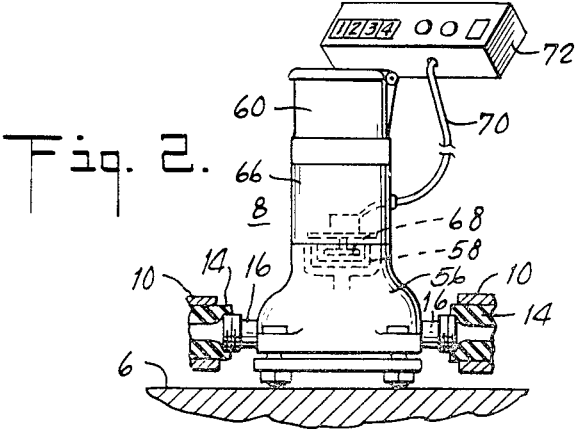
Fig. 2.
Fig. 4.
| FIG. 4a. |
| FIG. 4b. |
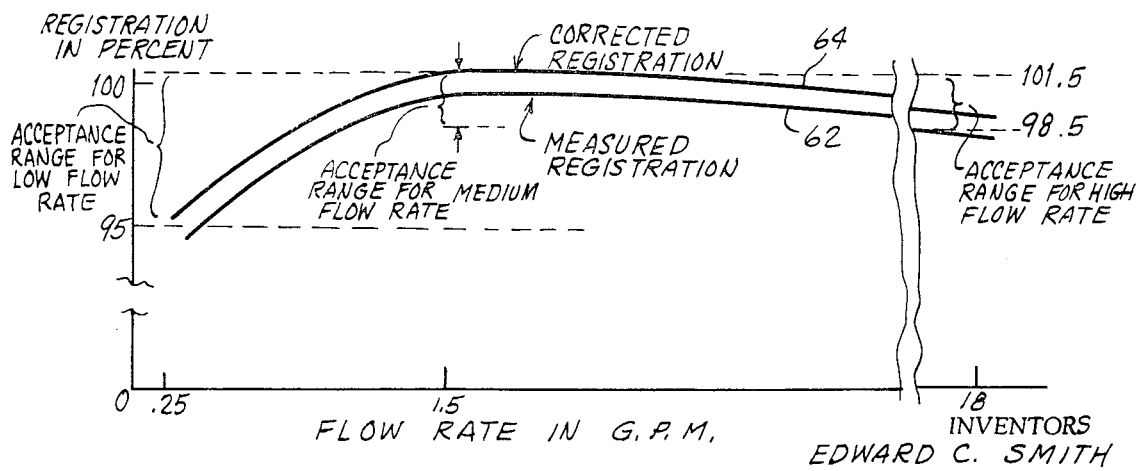
Fig. 3.
INVENTORS
EDWARD C. SMITH
CARL P. KIMBALL
BY Lester R. Clark
ATTORNEY

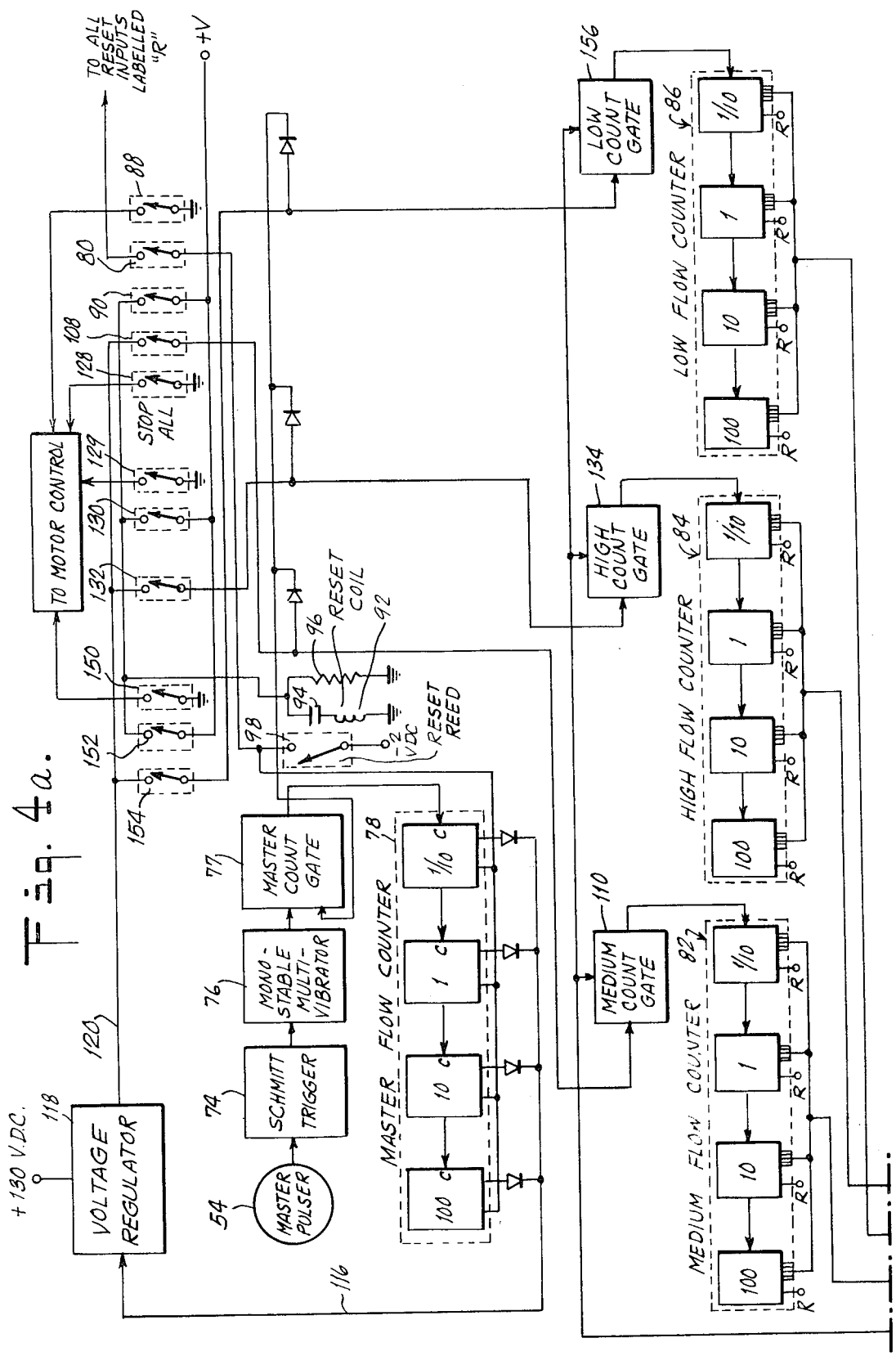

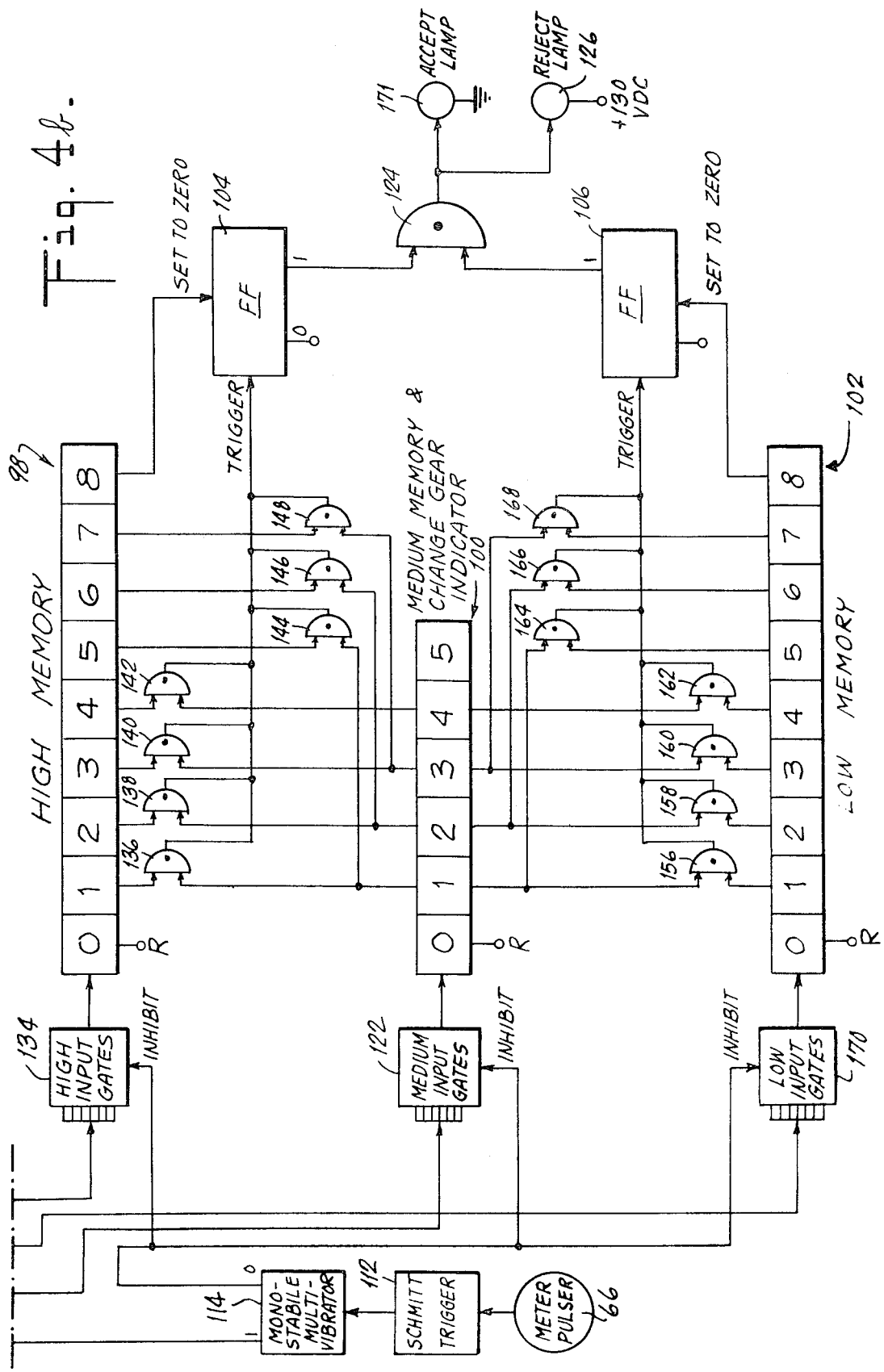

HIGH-SPEED CALIBRATION OF LIQUID FLOW METERS

BACKGROUND OF THE INVENTION

1. Field of the Invention

The invention relates to proving and calibrating volume or rate-of-flow meters or elements, and is particularly directed to high-speed calibration of a plurality of meters at a plurality of different flow rates, as carried out in an automated sequence of steps.

2. Description of the Prior Art

Liquid flow meters, for example those of the nutating disc type, commonly comprise a flow-measuring unit driving an output shaft whose rotations measure the volume of flow, and a register unit adapted to be driven by the flow-measuring unit and including a reduction gear commonly called gear ratio. Such meters are tested by running a known volume of fluid through the meter and noting the reading of the meter register. The difference from correct registration is noted by an operator who selects from several available register units, having different gear ratios, the one which would cause a reading acceptably close to correct. The particular gear ratio needed for a particular meter can be ascertained by direct calculation, by reference to tables, by means of special slide rules, or by auxiliary dials which can be clipped onto the face to the register. See for example, Hirsch, U.S. Pat. No. 3,005,333. An undesirable feature of these methods is the necessity for human intervention involving calculation and discretion and thus the possibility of human error. Another undesirable feature is the multiple repeated operations required to use more than a single flow rate, when it is known that the use of a single flow rate may not result in proper calibration for other flow rates encountered in actual use of the meter.

Another prior art method shown in U.S. Pat. No. 3,021,703 and Boyle, U.S. Pat. No. 3,120,118 involves connecting a meter in series with a cylinder having a piston moving past two limit switches. A pulse generator driven by the meter shaft generates a series of pulses proportional in number to the meter shaft output. The pulses are accumulated in a counter which is turned on when the piston trips one of the limit switches, and is turned off when the piston trips the other limit switch. The volume of fluid that the piston displaces in its travel between the two limit switches is known; thus the contents of the counter are indicative of the meter registration. This method necessitates calculation by a human operator of the gear ratios necessary for adequate calibration of the tested meters and is subject to serious error should the positions of the limit switches change even very slightly. Such tests are commonly carried out at a single flow rate.

The invented meter calibration avoids the undesirable features of the prior art by providing an automated testing and calibrating sequence which determines if and how a meter can be corrected to come within an acceptable registration range in an optimum manner, and which carries out the testing and calibrating at several flow rates. The several flow rates may be chosen to be representative of the complete range of flow rates encountered by the meter under actual operating conditions.

SUMMARY OF THE INVENTION

The invention is in high-speed testing and calibration of liquid flow meters by means of an electronic system controlling a multiple meter test bench.

A plurality of meters, connected so that the test liquid flows through them in series, are tested first at medium flow rate to determine, for each meter, if the meter can be calibrated to register within an acceptable registration range by one of several available gear ratios, and if so, which of the available gear ratios results in registration closest to, but not above, the upper limit of the acceptable registration range.

The meters are then tested at high flow rate, near the upper limit of flow rates expected in normal meter operation, to determine if each meter, with the gear ratio chosen after the medium flow rate test, can register within an acceptable registration range at the high flow rate. The acceptable registration ranges at medium and at high flow rates may be different from each other.

Next, the meters are tested at low flow rate, near the lower end of expected operational flow rates, to determine if each meter, as combined with the previously chosen gear ratio, can register within an acceptable registration range, which may be different from the acceptable ranges for medium and high flow rates.

The testing and calibrating system embodying the invention includes a test bench for quickly connecting a plurality of meters in series combination, a source of test fluid (such as water) under pressure, and means for establishing and maintaining medium, high and low flow rates for predetermined periods of time. This means includes a program-controlled variable speed motor which causes a hydraulic cylinder to establish and maintain the three different flow rates during a single piston stroke.

At the medium flow rate, photoelectric pulses coupled with the meters under test generate pulses which are proportional in frequency to the flow rate through the meter. These pulses are counted over periods of time defined by the time that it takes to pass a standard volume of test liquid through the meters. In particular, the time periods are established by counting a predetermined number of pulses generated by a tachometer-like photoelectric pulser coupled with the motor driving the hydraulic cylinder piston. The measured registration of each meter is displayed in percentage of correct registration, and a gear having a ratio best suited to correct the displayed registration is chosen by means of an electronic circuit, and is identified by a displayed number.

A meter register containing a gear having the chosen ratio is installed on each meter, and the meter registration is again measured in a similar manner at high and at low flow rates.

An electronic circuit determines if each meter, as corrected by means of a particular gear ratio, is within the predetermined registration range at each flow rate. If so, a "registration" light, which has been on up to the end of the low flow rate test, is turned off and an "accept" light is turned on to indicate in a fail-safe manner that the particular meter is acceptable.

The flow rate at which a test is carried out is measured and displayed for each different flow rate by means of an electronic circuit.

The invented testing and calibrating system can be used with either a plurality of meters, or with a single meter. Although it is described as using three different flow rates and a particular acceptable registration range for each, it should be obvious that a different number of different flow rates can also be used, with differently chosen acceptable registration ranges for each of the flow rates. A single gas meter at a time may be calibrated by a particular embodiment of the invention.

BRIEF DESCRIPTION OF THE DRAWINGS

FIG. 1 is a partly elevational, partly diagrammatic view of a test bench and a hydraulic system used in connection with an embodiment of the invention.

FIG. 2 is a partly elevational, partly sectional and partly perspective view of a meter under test, as connected on the test bench of FIG. 1, and of a housing for an electronic circuit associated with the meter.

FIG. 3 is a flow rate v. registration graph showing a curve for a typical meter prior to correction and a curve for the meter as corrected by an appropriate gear ratio, and showing exemplary acceptable registration ranges at three exemplary flow rates.

FIG. 4 is a block diagram, showing how FIGS. 4a and 4b fit together.

FIGS. 4a and 4b are a block diagram of the electronic circuits associated with a meter under test in the hydraulic system shown in FIG. 1.

DETAILED DESCRIPTION

Figure 1

Figure 5:
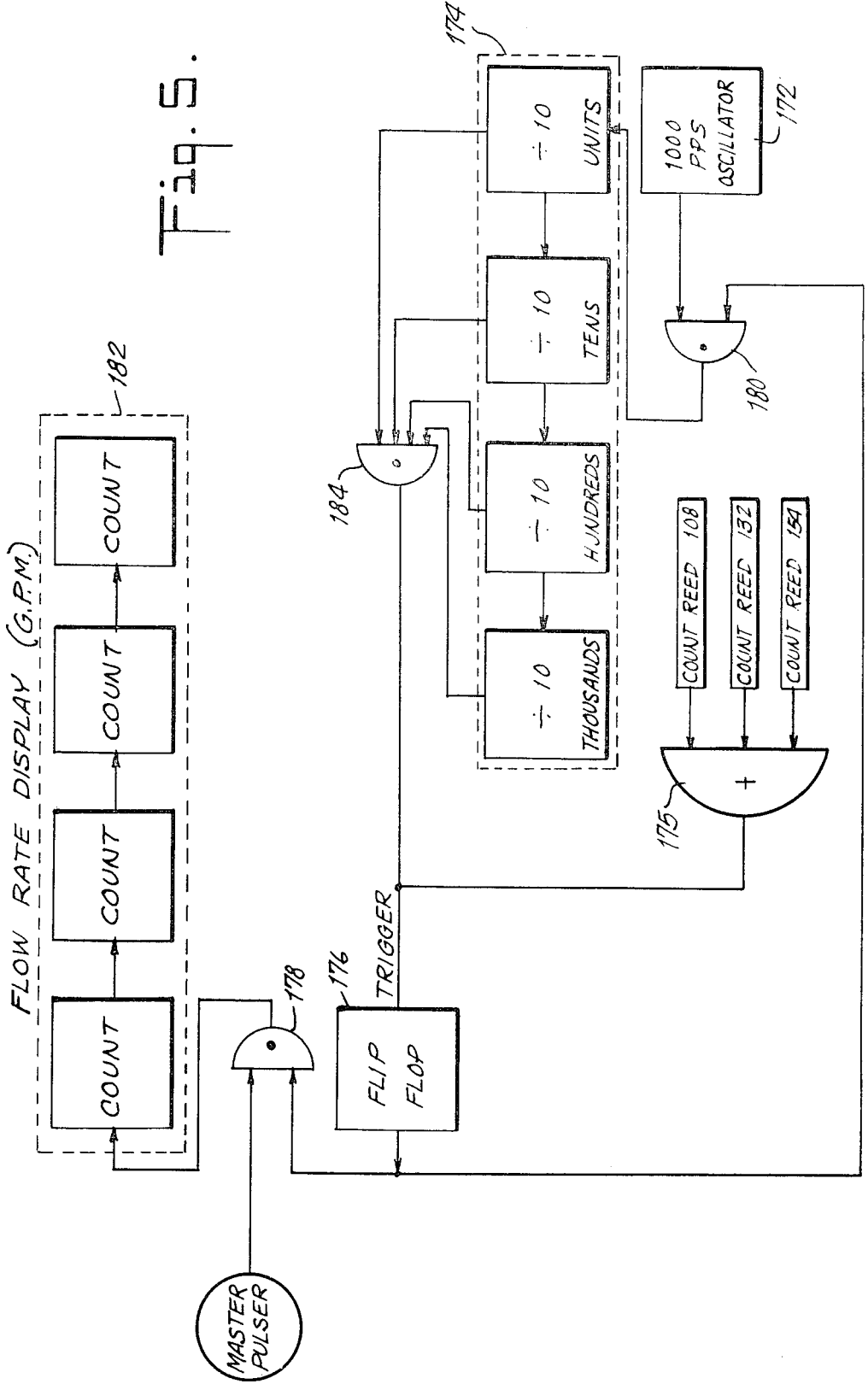
FIG. 5 is a block diagram of an electronic circuit for monitoring the actual flow rate through meters under test.

The invention is particularly described as used in testing and calibrating nutating disc liquid flow meters.

The general object of the invention is to measure the registration of each flow-measuring unit at several flow rates, to combine the measured registrations in order to determine if the flow-measuring unit can be matched with an available gear ratio so as to cause the flow-measuring unit to drive a register within an acceptable registration range, and to select a gear ratio which best matches the flow-measuring unit. Testing and calibrating is carried out in an automated sequence which minimizes human discretion and thus minimizes the possibility of human error.

A means for establishing and maintaining different flow rates through the meters under test is shown in FIG. 1 and includes a test bench generally indicated at 6. Test benches of this type are known in the art. They are used to temporarily connect a plurality of meters 8 so that the test liquid flows through them in series, by means of transverse members 10 slidably mounted on a pair of parallel rails 12. Each of the transverse members 10 has at its middle section a rubber bushing 14 matching in size meter inlet and outlet pipes 16 such that the meters 8 are hydraulically in series when clamped tightly between the transverse members 10. The transverse members 10 are pressed against the meters by means of a lead screw 18 turned by a hand crank 20 and guided through an internally threaded crossmember 22 rigidly connected to the rails 12. A crossmember 24, longitudinally opposite the hand crank 20, is also rigidly connected to the rails 12 so as to act as a backstop.

Controlled flow rates through the meters 8 are established and maintained by means of a hydraulic cylinder 26 enclosing a tightly fitting piston 28 moved by a shaft 30 between the two ends of the cylinder 26. The shaft 30 is driven by means of a conventional lead screw arrangement generally indicated at 32 and operated by a variable speed electric motor 34 to move the piston 28 in either direction. The testing system is connected to a suitable water supply through a solenoid valve 36 whose outlet feeds both the series connected meters 8 and the left-hand end of the cylinder 26. The outlet of the meters 8 feeds, as controlled by a solenoid valve 38, either the right-hand end of the hydraulic cylinder 26 or a dump tank. Pressure gauges 42 and 44 monitor the pressures in the cylinder at opposite sides of the piston 28.

Briefly, the automated testing and calibrating sequence of the system of FIG. 1 is preceded by purging the meters 8 of air by opening the valves 36 and 38 and allowing free flow of water through the meters. Solenoid valve 38 is then closed and the system is ready to begin the testing and calibrating sequence during which several steady-state flow rates are established and maintained in sequence through the meters 8, and the registration of each meter is recorded at each of these flow rates. Note that at this time the pressure drop across the piston 28 is not the pressure difference between the water supply and the dump tank (which is of the order of 200 p.s.i.), but only the pressure drop due to the flow resistance of the series combination of the meters 8 (which is of the order of 40 p.s.i. for 10 meters). This allows the use of a motor 34 with lower power rating. The number of meters 8 in the series connection is limited only by the permissible pressure drop across the piston 28.

At the start of the testing and calibrating sequence, the piston 28 is at the right-hand end of the cylinder 26. The motor 34 is turned on to begin drawing the piston 28 to the left at a constant speed selected to establish medium flow rate (e.g., 1.5 g.p.m.) through the meters 8. After sufficient time has elapsed to allow steady-state flow free of transients to be established, a magnet 46 which is rigidly connected to the piston shaft 30 trips a reed switch mounted on a control board 48. This initiates a procedure during which the registration of each of the meters 8 is measured and recorded by an individual electronic system described particularly in connection with FIGS. 4a and 4b. The reed switches mounted on the control board 48 are not shown in FIG. 1, for the sake of keeping the drawing simpler, but are shown in detail only in FIG. 4a and are discussed only in connection with the operation of the circuit of that figure.

On the basis of the medium flow rate measurement, the electronic system identifies, e.g., by an arbitrarily assigned number, a specific gear ratio which best matches each of the meters 8. Meter registers having the proper gear ratios may now be coupled with each of the meters 8, so that during the subsequent tests, each meter will be driving its intended torque load.

The motor 34 is now caused to operate at a different constant speed calculated to draw the piston 28 at a speed establishing high flow rate (e.g., 18 g.p.m.) through the meters 8. After a time interval sufficient to allow steady-state flow free of transients, the magnet 46, which travels with the shaft 30, trips another reed switch on the control board 48 to initiate a procedure during which the registration of each meter is again measured and recorded electronically. Following that, the motor 34 is caused to operate at a third constant speed calculated to establish low flow rate (e.g., 0.25 g.p.m.) through the meters 8. Again, after allowing for the establishment of steady-state flow, the magnet 46 trips another reed switch on the control board 48 to initiate measuring and recording electronically the registration of each of the meters 8 at the low flow rate.

The electronic system then combines the three measured registrations for each of the meters 8 to determine if a meter can be brought within an acceptable registration range for each of the low, medium and high flow rates by the gear ratio chosen for it on the basis of the medium flow rate measurement. Meanwhile, the magnet 46 continues its travel to the left until it trips a limit switch 50 which causes recycling of the system. For recycling, valve 36 remains open, solenoid valve 38 is opened, and the motor 34 is reversed to drive the piston 28 to the right until the magnet 46 trips another limit switch 52 to stop the motor 34 and signal the end of the recycling procedure. At this time, the piston 28 is again at the right-hand end of the cylinder 26.

A master pulser 54, which may be a photoelectric pulser of conventional construction, is operatively connected to the shaft of the electric motor 34 to generate electrical pulses at a rate directly proportional to the rotational speed of the motor 34. Each pulse from the master pulser 54 means that the piston 28 has traveled a particular increment of distance and that a particular increment of volume of the test liquid has been passed through the meters.

An electronic circuit in a housing 73 measures and displays the actual flow rate through the meters 8 at each flow rate.

In reference to FIG. 2, a meter 8 comprises a meter body 56 serving as a flow-measuring unit and having a chamber containing a disk (not shown) which nutates under the action of fluid flowing between the inlet and outlet pipes 16. The nutating disk imparts rotational motion to a driving magnet 58 to cause it to rotate at a speed proportional to the flow through the meter body 56. A conventional register 60 is commonly attached directly over the meter body 56 such that its driven magnet (not shown) rotates together with the driving magnet 58 to operate the register dial through a set of gear wheels called gear ratio. A magnetic coupling of this type is disclosed in U.S. Pat. No. 3,442,126 issued to Kenneth Southall.

Registration of a meter may be defined as the dimensionless ratio between the actual number of nutations and the number of nutations ideally required to displace a given volume of liquid. The ratio of nutations is usually expressed in percentage. Thus, registration of 90 percent means that a meter goes through only nine nutations for a given volume of water which would cause 10 nutations in an ideally accurate meter; registration of 110 percent means that a meter goes through 11 nutations for a given volume of liquid which would cause only 10 nutations in an ideally accurate meter.

In a typical meter, the registration varies as a function of flow rate through the meter. The variation may be represented graphically as a curve 62 of FIG. 3, which is a plot of percentage registration vs. flow rate in gallons per minute. As is evident from FIG. 3, the percentage registration of a typical meter is usually at peak level at medium flow rate within the range of rates for which the meter is designed. The registration is somewhat lower at the high end of the flow rate range for which the meter is designed, and is considerably lower at the low end of the flow rate range. It may be determined from experience that the average registration of a meter is acceptably close to 100 percent when the maximum registration shown at any flow rate is 101.5 percent. Then, it would be desirable to correct the registration of a meter by a particular gear ratio such that the registration at medium flow rate is very near, but not above 101.5 percent. It may be the case that it is not desirable for a meter to register below a set limit for a particular flow rate. Then, meters which do so register must be rejected.

As one example, it may be determined that a meter should register, at medium flow rate of about 1.5 g.p.m., at no less than 98.5 percent and at no more than 101.5 percent. This registration range is then called "acceptance range." Similarly, it may be determined that the acceptable registration range at high flow rate (e.g., about 18 g.p.m.) is also from 98.5 to 101.5 percent and that acceptable registration range at low flow rate (e.g., about 0.25 g.p.m.) is from 95 to 101.5 percent.

Instead of determining the registration of a flow-measuring unit by using it to drive a carefully calibrated standard register, the invention utilizes a pulser 66 (see FIG. 2) which fits mechanically directly above a meter body 56 in the same mechanical manner as a conventional register 60. For the purpose of coupling with the meter body 56, the pulser 66 has at its lower end a driven magnet 68 which is within the magnetic field of the driving magnet 58 and rotates with it. The driven magnet 66 transmits its rotational motion to a pulsing unit which may comprise a conventional combination of a slotted disk and photocell source and detector. The meter pulser 66 has at its upper end a driving magnet configuration identical to that of the meter body 56 so as to be able to accept a conventional register 60 and to transmit thereto the motion of the driving magnet 58 of the meter body. Care is taken to construct the meter pulser such that the frictional load which it imposes between the meter body 56 and the register 60 is negligible.

The electrical circuitry of the pulser 66 is connected by a cable 70 to an electronic circuit contained in a housing box 72. The circuit is described in detail in connection with FIGS. 4a and 4b.

Figures 4a and 4b

Each of the meters 8 has associated with it an electronic system contained in a suitable housing 72 and serving to test each meter by measuring its registration, and displaying the results. The electronic circuits in each of the housings 72 are identical; therefore only one is shown in FIGS. 4a and 4b and described in detail below.

It is considered desirable to give a brief introductory description of the operation of the electronic system shown in FIGS. 4a and 4b. The master pulser 54 which is on the shaft of the electric motor 34 generates master pulses at frequency proportional to the motor speed. Thus, the frequency of the master pulses is a measure of the flow rate through the meters, and the sum of the master pulses over an interval of time is a measure of the volume of the flow through the meters 8 during that time interval. Each meter pulser 66 generates meter pulses at frequency which is a measure of the rate of nutation of the meter disk and the sum of the meter pulses over a time period defined by the passing of standard volume of test liquid through the meters is a measure of the registration of the meter.

The design objective is to define a time interval by means of counting a predetermined number of master pulses, and to count the pulses from each of the meter pulsers 66 during the same time interval. For convenience, the time interval may be chosen such that the count of meter pulses is a round number, e.g., 1,000, for a meter having 100 percent registration. Note that the time interval is different for different flow rates, and that it must start and end within a period of steady-state flow through the meters 8 so as to avoid undesirable effects of transient variations in the flow.

Before the electronic system shown in FIGS. 4a and 4b begins actual operation, the solenoid valves 36 and 38 of FIG. 1 are opened by means of a conventional manual electric switch (not shown) for the purpose of establishing waterflow through the meters 8 to purge them of air. Then, solenoid valve 38 is closed by a conventional timer (not shown) having time delay sufficient to allow complete purging of the meters 8. At the end of the time delay, the same timer turns on the electric motor 34 which begins operating at a speed corresponding to medium flow rate of 1.5 g.p.m.

Now the electronic system of FIGS. 4a and 4b is in operation. As soon as the shaft of the electric motor 34 begins rotating, the master pulser 54 begins generating pulses proportional in frequency to the rotational speed of the motor shaft. These master pulses are given proper amplitude and shape by means of a Schmitt trigger 74 and by means of a conventional monostable multivibrator 76, but cannot reach a master flow counter 78 to be counted therein because a master counter gate 77, which acts as an AND gate, is closed at that time.

The master flow counter 78 is a conventional decimal counter having four series-connected stages, each stage having one decimal digit capacity, i.e., capable of storing any one of the decimal digits 0 through 9, and each stage having a reset input for resetting that stage to its zero state. Each stage also has a counting input, labeled C, for receiving pulses to be counted.

There are three more similar four-stage decimal counters, namely, a medium flow counter 82, a high flow counter 84, and a low flow counter 86. Each stage of these three counters has a reset input labeled R, and all reset inputs R are connected together. There are, as shown in FIG. 4b, three conventional decimal ring counters, labeled respectively, high memory 98, medium memory and change gear indicator 100, and low memory 102. Each of the ring counters 98, 100 and 102 has a reset input which is labeled R and is connected with all other reset inputs labeled R.

The first logical operation at the start of the meter measuring and testing sequence is to reset all four of the counters 78, 82, 84 and 86, and all three ring counters 98, 100 and 102 to their zero states. This is accomplished as follows: After the motor 34 has been turned on, it begins drawing the piston 28 to the left-hand side of FIG. 1, and the magnet 46 which moves with the piston shaft 30 closes by its magnetic action a medium flow reed switch 88 (FIG. 4a) which is positioned on the reed switch board 48 (FIG. 1). The reed switch 88 is in the circuit of a conventional motor control system (not shown) for the variable speed motor 34 and its closing causes the motor control system to operate the motor 34 at a constant speed corresponding to medium flow rate of 1.5 g.p.m. through the meters 8.

The next reed switch in the path of the magnet 46 along the reed switch board 48 is an all-reset reed 80 which, when closed, connects together the reset inputs of the master flow counter 78 with the reset inputs labeled R of the counters 82, 84 and 86, as well as with the reset inputs R of the ring counters 98, 100 and 102, and with the reset inputs of flip-flops 104 and 106.

The next switch in the path of the moving magnet 46 is a medium reset reed switch 90 which connects a reset coil 92 between a positive voltage power supply and ground. The reset coil 92 is in conventional combination with series capacitor 94 and a parallel resistor 96. Due to the current between the power supply and ground, the field of the reset coil 92 now closes a reset reed switch 98 and a source of negative voltage is applied to the reset inputs of the master flow counter 78 and to all reset inputs labeled R. Now the counters 78, 82, 84, 86, the ring counters 98, 100 and 102, and the flip-flops 104 and 106 are cleared to their zero states, and the system is ready to proceed with its first measurement.

In the course of the first measurement, a predetermined number of master pulses is used to define a time interval during which a predetermined volume of water passes through the series combination of the meters 8. A count of meter pulses from each meter is accumulated during the same time interval to serve as a measure of the meter registration.

It has been calculated, on the basis of physical measurements, that the volume of water producing 1,000 meter pulses for a meter of 100 percent registration is moved by the motor 34 in a time slot defined by 993 master pulses. Thus, the accumulation of meter pulses is to start at the same time as the accumulation of master pulses, and it is to end when the 993rd master pulse is counted. Note that the particular number of master pulses has been chosen on the basis of characteristics such as size of the hydraulic cylinder 26, and it may be different for different embodiments of the invention.

Both the master flow counter 78 and the medium flow counter 82 are enabled by the closing of a medium count reed switch 108 by the traveling magnet 46. It is noted that the switch 108 is spaced from the switch 88 (which establishes medium flow rate) by a distance which is travelled by the magnet 46 in a time span sufficient to allow establishment of steady-state flow through the meters 8.

As the medium count reed switch 108 closes, a high voltage level from the output of a voltage regulator 118 is applied to the master count gate 77 and to a medium count gate 110 so as to enable both gates simultaneously. The master pulses from the master pulser 54, as shaped by the Schmitt trigger 74 and by the monostable multivibrator 76, are now counted by the counter 78; the meter pulses from the meter pulser 66, as similarly shaped by a Schmitt trigger 112 and by a monostable multivibrator 114, are counted by the medium flow counter 82.

When the count in the master counter 78 reaches 993, as determined by patch plugs on appropriate counter pins, the resulting voltage on counter output line 116 disables the voltage regulator 118 which also acts as a NAND gate. The high voltage level is thus no longer present on the line 120 at the output of the voltage regulator 118, and the gates 77 and 110 are disabled. Both the master counter 78 and the medium flow rate counter 82 stop counting.

The count in the medium flow rate counter 82 is at this time a measure of the registration of the meter 8 with which it is associated, and reads registration directly in percent. The registration is displayed by means of conventional integral Nixie tube displays (not shown) visible through a suitable window on the face of the housing 72 (FIG. 1).

The registration at medium flow rate is now displayed in percentage as a four-digit decimal number having one significant digit after the decimal point. A gear ratio is to be selected now which corrects the registration to just at or below 101.5 percent. If, for example, there are four available gear ratios providing corrections of respectively −1.1, −0.5, 0.0, and 0.7 percent, it is clear that the contents of the medium flow rate counter 82 should not exceed 102.6 percent. A meter having measured registration of 102.7 percent or above cannot be corrected by any of the available gear ratios and should be rejected. Similarly, a meter having measured registration of 97.7 percent or less cannot be made to register at or above the lowest acceptable registration of 98.5 percent, and should also be rejected. For meters having measured registrations from 97.8 to 102.6 percent, a gear ratio should be selected such that they would register not above 101.5 percent, but as close to it as possible. The gear ratio correction values and the registration values discussed here are only exemplary; different values may be used for different applications.

The determination of which meters, if any, should be rejected at this time, and what gear ratio should be selected for each of the meters which at this time are considered acceptable, is made with the help of a circuit including input gates 122 and the ring counter 100. The input to the gates 122 is from the output of the medium flow counter 82. By means of patch plugs on appropriate output pins at the four stages of the counter 82, and by means of a conventional array of AND gates serving as gates 122, the gates 122 produce an output pulse at the counts, in counter 82, of 978, 1009, 1016, 1021 and 1027. Each such output pulse trips the ring counter 100 to step it to its next higher state.

At the time the medium flow counter 82 begins accumulating a count of meter pulses, the ring counter 100 is at its zero state. At the time the count in the medium flow counter 82 reaches 978, the combination of patch plug connections and the medium input gates 122 produces a pulse which steps the ring counter 100 to its state labeled "0.1." Each of stages 0 through 5 of the ring counter 100 is conventionally connected with a Nixie tube display (not shown) which displays the number labeling the particular stage. If the count in the medium flow counter 82 never reaches 1,009, the Nixie tube displaying the number "1" remains lit to indicate that gear ratio number "1" (providing correction of +0.7 percent) should be chosen for the meter under test to bring its registration to the acceptable low of 98.5 percent. If the count in the medium flow counter 82 reaches 1,009, the combination of patch plug connections and the medium input gates 122 produces another pulse which steps the ring counter 100 to its state 2. At that time the Nixie tube display shows the number "2" to indicate that gear ratio number "2" (providing correction of 0.0 percent) is to be chosen for the meters so as to keep its registration within 101.5 percent. Similarly, the ring counter 100 is stepped to its state 3 at a count of 1,016 in the medium flow counter 82, and the Nixie tube showing the number "3" lights up to indicate that gear ratio number "3," providing correction of −0.5 percent is to be chosen. At a count of 1,021 in the medium flow counter 82, the ring counter 100 is stepped to state 4, and the corresponding Nixie tube lights up to show that gear ratio number "4," providing correction of −1.1 percent is to be chosen. If the count in the medium flow counter 82 reaches 1,027, the ring counter 100 is stepped to state 5. When the Nixie display is 0 or 5, a clear indication is provided that the meter cannot be brought within the acceptable registration range by any of the available gear ratios, and that it is rejected.

A means is provided to prevent undesirable stepping of the ring counter 100 due to transient voltages developed as the medium flow counter 82 is being tripped to its next higher state. It includes the 0 output of the monostable multivibrator 114 whose 1 output is delivering pulses to be counted by the medium flow counter 82. The 0 output of the multivibrator 114 is applied to the inhibit input of the medium input gates 122 such that the gates 122 are disabled while the pulse from the 1 output of the multivibrator 114 is being counted by the medium flow counter 82, and are enabled only while the counter 82 is in steady state.

When the count in the master flow counters 78 reaches 993, the patch plugs connected to appropriate output pins of the counter 78 carry a voltage level which is applied by means of line 116 to the voltage regulator 118 to cause its output voltage on line 120 to drop to low level. When the voltage on the line 120 is at low level, the master count gate 77 and the medium count gate 110 are closed. Whichever Nixie tube associated with the ring counter 100 was lit at the time the master flow counter 78 reached its 993rd pulse, remains lit to indicate the best gear ratio for the particular meter.

The travelling magnet 46 next closes a stop-all reed switch 128 which stops the motor 34 to give the operator of the testing and calibrating system time to install on each meter 8 a register with the gear ratio indicated by the appropriate Nixie tube display. The registers are installed at this time for the purpose of testing the meters 8 further while they are subject to the torque loads imposed on them by the registers in normal operation, as well as for the purpose of double checking the registers themselves.

After the meter registers are installed, the meter registrations are again measured electronically at two additional flow rates, one near the high end of flow rates expected to be encountered in normal operation of the meters, and one near the low end of expected flow rates, so as to accept only meters that can register within acceptable limits throughout their operating flow rate range.

These additional registration measurements are started by again turning on the motor 34 by means of a conventional manual switch (not shown). The motor 34 begins drawing the piston shaft 30, and the magnet 46 closes a reed switch 129 which is connected with the motor control. The closing of the switch 129 causes the motor 34 to operate at speed resulting in high flow rate (e.g. 18 g.p.m.) through the meters 8. The magnet 46 continues its travel along the reed switch board 48 and closes next a high reset reed switch 130. The closing of the switch 130 connects the reset coil 92 between a positive voltage source and ground, and the resulting current through the reset coil 92 creates a field which closes the reset reed 98. When the reset reed 98 is closed, a negative voltage source is applied to the reset inputs of the master flow counter 78 to clear it to its zero state. Note that at this time the all reset reed 80 is open because it is no longer under the influence of the magnetic field of the magnet 46, and the negative voltage source is not applied to the resetting inputs labeled "R." Thus, only the master flow counter 78 is cleared at this time.

The magnet 46 next reaches a high count reed switch 132 which is spaced from the reed switch 129 such that steady-state flow through the meters 8 is established in the time that it takes the magnet 46 to travel between the switches 129 and 132.

When high count reed 132 is closed, the high voltage level which is now present at the output line 120 of the voltage regulator 118 is applied to the master count gate 77 and to a high count gate 134 to enable both gates. Since the master count gate 77 is now enabled, the master flow counter 78 begins accumulating a count of master pulses from the master pulser 54; the high flow counter 84 begins calculating meter pulses from the meter pulser 66. When the count in the master flow counter 78 again reaches 993, the voltage level at the line 116 connected by patch plugs on appropriate counter pins causes the voltage level at the output of the voltage regulator 118 to drop to low level. The low voltage level on the output line 120 causes the master count gate 77 and the high count gate 134 to be disabled. The count in the master flow counter 78 is thus stopped at 993; the count in the high flow counter 84 is stopped at a value which expresses the registration of the meter at the high flow rate directly in percentage.

If the allowable registration range at high flow rates is between 98.5 and 101.5 percent, then the meter must register within these limits, but only when corrected by the gear ratio chosen at the medium flow rate registration measurement. Thus, if a gear ratio providing a correction of −1.1 percent was chosen for the meter, the measured meter registration at high flow rate must not exceed 102.6 percent and must not be below 99.6 percent. As another example, if a gear ratio providing correction of +0.7 percent was chosen, the measured registration at high flow rate must not exceed 100.8 percent and must not be below 97.8 percent. The function of correlating measured registration at high flow rate with measured registration at medium flow rate and chosen gear ratio in order to determine if a meter is within acceptable registration limits is carried out with the help of patch plugs connected to appropriate output pins of the high flow counter 84, with the help of high input gates 134, and of the high memory 98, which is a decimal ring counter of which eight positions are utilized. Conventional two-input AND-gates 136, 138, 140, 142, 144, 146 and 148, and the flip-flop 104 are also used.

By suitably connected patch plugs at the outputs of the high flow counter 84 and by means of a suitably arranged array of conventional AND gates serving as high input gates 134, the ring counter serving as high memory 98 is caused, in the example given, to step to its first state at the 978th meter pulse counted by the high flow counter 84; to step to its second state at the 985th meter pulse, and to step to its third fourth, etc., states at respectively the counts of 990, 996, 1,009, 1,016, 1,021 and 1,027 meter pulses in the high flow counter 84. Again, these values are for the particular embodiment described in detail herein; different suitable values may be used to the same end in different embodiments.

As one example, suppose that a gear ratio providing correction of +0.7 percent was chosen for the particular meter, and that stage 1 of the ring counter serving as medium memory and change gear indicator 100 is on. If the high memory 98 is never stepped to its state 1 but remains at state 0, the flip-flop 104 remains at its 0 state (to which it was set at the beginning of the testing sequence). If, however, the high memory 98 is stepped to its state 1, the AND-gate 136 is enabled and its output triggers the flip-flop 104 to its state 1, producing thus a high voltage level at its output labeled 1 and connected as one of the inputs of an AND-gate 124. The meter under test is acceptable for this flow rate so long as its measured registration at high flow rate does not exceed 100.8 percent (and is not below 97.8 percent). If its measured registration at high flow rate is 100.9 percent or above, the gear ratio providing correction of +0.7 percent would cause it to register at 101.6 percent or above at high flow rate, which is above the allowed limit. Such undesirable combination is detected if the high memory 98 is ever stepped to its state 5 which corresponds to a count of 1,009 in the high flow counter 84. If state 5 of the high memory 98 comes on while state 1 of the medium memory and change gear indicator 100 is on, the AND-gate 144 is enabled and, since the flip-flop 104 is now in its state 1, the resulting voltage level change at the output of the AND-gate 144 triggers the flip-flop 104 back to its zero state.

A meter is finally classified as acceptable only if each of the measured registrations, for each flow rate, is within the limits specified or calculated to be acceptable.

As another example, if state 4 of the medium memory and change gear indicator 100 is on, which means that a gear ratio providing correction of −1.1 percent had been chosen for the particular meter, then the flip-flop 104 is triggered to its state 1 when state 4 of the high memory 98 comes on, indicating that the meter registers at least at 99.6 percent at high flow rate (corrected to 98.5 percent by the −1.1 percent gear ratio). On the other hand, the flip-flop 104 is set directly back to its zero state if state 8 of the high memory ranking 8 is reached as the result of measuring registration of 102.7 percent at high flow rate. Registration of 102.7 percent can not be corrected to within 101.5 percent by the chosen −1.1 percent gear ratio.

After the meter registration has been measured at high flow rate, the motor 34 continues operating at the same speed until the magnet 46 closes a reed switch 150 which is connected to the motor control and which causes the motor 34 to operate at a speed corresponding to low flow rate (e.g., 1.5 g.p.m.) through the meters 8. Further along its path, the magnet 46 closes a low reset reed 152 which, in the same manner as the high reset reed 130, resets the master flow counter 78 to its zero state, but does not disturb the states of any other counters or flip-flops. Note that, when the master flow counter 78 is at any state other than 993, the voltage level from the patch plugs at its outputs allows the voltage regulator 118 to again apply high voltage level to the line 120.

The magnet 46 next reaches a low count reed 154 which is spaced from the reed switch 150 by a distance sufficient to allow for establishment of a low flow rate free of transients.

When the low count reed 154 closes, the master count gate 77 and a low count 156 are connected to the output of the voltage regulator 118 (which is now at high voltage level), and are thus enabled. The master flow counter 78 begins calculating pulses from the master pulser 54, and the low flow counter 86 begins accumulating meter pulses from the meter pulser 66. At the present count of 993 pulses in the master flow counter 78, the voltage regulator 118 is caused to drop its output to low voltage level and to thus disable the master count gate 77 and the low count gate 156. The count in the low flow counter 86 at this time gives the measured registration at low flow rate directly in percentage.

The registration at low flow rate must again be correlated with both the allowed registration range at low flow rate and with the gear ratio selected for the meter pursuant to the medium flow rate registration measurement in order to determine if the meter is acceptable or not.

For example, if a gear ratio providing correction of +0.7 percent has been selected for the meter, and if the allowable registration range at low flow rate is between 95 and 101.5 percent, the measured registration of an acceptable meter at low flow rate must not be below 94.3 percent and must not be above 100.8 percent. As another example, if the gear ratio providing correction of −1.1 percent has been selected, the measured registration at low flow rate must not be below 96.1 percent and must not be above 102.6 percent. This correlation is carried out with the help of a ring counter 102 serving as a low memory. It is stepped when the low flow counter 86 reaches certain counts as detected by patch plugs at appropriate counter pins of the counter 86 and by a suitable array of AND gates serving as low input gates 170. As in the case of correlation between the medium memory and change gear indicator 100 and the high memory 98, the correlation is carried out with the help of AND-gates 156, 158, 160, 162, 164, 166 and 168 connected as shown in FIG. 4b. Flip-flop 106 is of the same type and operates in the same manner as the flip-flop 104 mentioned previously.

As one example, if the count in the low flow counter 86 never reaches 943, the ring counter 102 serving as low memory remains at its zero state and the flip-flop 106 also remains at its zero state. If the medium memory and change gear indicator 100 is at its state 1, and the count in the low flow counter 86 reaches 943, the low memory 102 is tripped to its state 1. At this time AND-gates 156 is enabled and flip-flop 106 is triggered to its state 1. If the registration recorded in the low flow counter 86 reaches 100.9 percent, which— when combined with the gear ratio correction of 0.7 percent—exceeds the allowable limit of 101.5 percent, the low memory 102 is tripped to its state 5 and AND-gate 164 is enabled to trigger the flip-flop 106 back to its zero state. If the registration recorded in the low flow counter 86 is 102.7 percent or above, this means that the meter cannot be corrected to within allowable limits by any of the available gear ratios, and the low memory 102 is tripped to its state 8. When state 8 is on, its output is applied directly to that input of flip-flop 106 which sets it to its zero state. The counts of pulses in the low flow counter 86 at which each of stages 1 through 8 of the low memory 102 is tripped on are, starting with stage 1, respectively, 943, 950, 955, 961, 1,009, 1,016, 1,021, and 1,0027, for the particular example given here.

If the correlation between the medium memory and change gear indicator 100 and each of the high memory 98 and low memory 102 is such that both flip-flops 104 and 106 are in their one state, the AND-gate 124 is enabled and its output is at high voltage level. An indicator light 171 labeled ACCEPT, which is connected between the output of the AND-gate 124 and ground, is now turned on. At the same time, the voltage across an indicator light 126 labeled REJECT and connected between a high voltage level source and the output of the AND-gate 124, drops to a level which is too low to keep it lit; the REJECT light 126 goes off.

If either one of the flip-flops 104 and 106 is at its zero state, or if both flip-flops 104 and 106 are at their zero states, the AND-gate 124 remains closed, and the REJECT lamp 126 remains connected between a source of high voltage level and the low level output of the AND-gate 124. The REJECT lamp 126 thus remains on to indicate that the meter with which it is associated cannot be corrected to within acceptable limits by the gear ratio selected in the course of the medium flow rate test.

An embodiment of the invention is useful in calibrating a single gas meter at a time. An attempt to calibrate a plurality of gas meters connected serially would result in errors due to the compressibility of gas, but a single gas meter may be successfully calibrated, because the pressure drop across the single gas meter is the same as the pressure drop across the piston 28 at steady-state flow.

Figure 6

In the course of measuring the registrations of the meters 8, an indication is provided of the flow rate through the meters for the purpose of serving as a check on the operation of the hydraulic system establishing and maintaining flow through the meters, and for the purpose of informing an operator as to the current flow rate at which measurements are taken.

The flow rate through the meters 8 is determined by counting the master pulses from the master pulser 54 (FIG. 4a) over a predetermined period of time. Since the frequency of the master pulses is proportional to flow rate, a count of the pulses in a fixed time period is indicative of flow rate. For convenience and circuit simplicity, the time interval is chosen such that the count of master pulses gives flow rate directly in gallons per minute.

The time interval during which master pulses are to be counted is established by means of a fixed frequency oscillator 172 and a four-stage counter 174. A flip-flop 176 is triggered to its 1 state for the first time when the medium count reed switch 108 closes and enables an OR-gate 175. The high voltage level at the output of the flip-flop 176 enables simultaneously two AND-gates 178 and 180. When the AND-gate 178 is enabled, it allows a flow rate display counter 182 to start counting the master pulses generated by the master pulser 54; when the AND-gate 180 is enabled, it allows the counter 174 to start counting the pulses generated by the fixed frequency oscillator 172.

It has been calculated that on the basis of the 1,000 p.p.s. frequency of the oscillator 172 and on the basis of the physical characteristics of the system that the count of master pulses reads flow rate directly in gallons per minute if the master pulses are allowed to accumulate for a time interval of 1.266 seconds. The counter 174 is connected by means of patch plug connectors and an AND-gate 184 such that the AND-gate 184 produces high output at the count of 1,266 in the counter 174. The output of the AND-gate 184 triggers the flip-flop 176 back to its zero state which causes the AND-gates 178 and 180 to close. The count in the flow rate display 182 is now the flow rate in gallons per minute.

The process is repeated again when the high count switch 132 closes, and again when the low count reed switch 154 closes.

Recycling

The total time that the invented system takes to calibrate one set of series-connected meters is substantially less than 2 minutes. To this must be added the time between medium and high flow rate measurements that a system operator takes to install on each meter 8 a register 60 having the gear ratio identified by means of a number displayed under control of the medium memory 100.

After the end of the low flow rate measurement, the magnet 46 trips a limit switch 50 (FIG. 1) which signals the start of recycling.

When the limit switch 50 closes, the solenoid-controlled valve 38 opens to drain the test bench 6 and the meters 8. Simultaneously, the motor 34 is reversed, to start pushing the piston 28 back to the right-hand side of the cylinder 26, and continues doing so until the magnet 46 trips another limit switch 52 which turns off the motor 34.

The system operator can shut off the water supply and can remove the tested meters 8 from the test bench 6 by rotating hand crank 20 to allow the crossmembers 10 to slide to the right and release the meters 8. A new set of meters can then be placed on the bench, and clamped tightly for a new testing and calibrating run.

What is claimed is:

1. Apparatus for calibrating a set of liquid flow meters including at least one liquid flow meter, comprising:
   a. means for establishing and maintaining liquid flow through said set of meters in a selective succession of flow rates different from each other, said means including a hydraulic cylinder having a movable piston, a fixedly supported variable speed electric motor having a motor shaft, a lead screw connecting the motor shaft and the piston for moving the piston along the long axis of the cylinder at speed proportional to the motor speed, and means for causing the motor to operate at a successive plurality of steady-state speeds during a single stroke of the piston;
   b. means responsive to each of the meters in the set for generating a separate indication of the registration of each meter at each of said succession of flow rates; and
   c. means responsive to the plurality of separate registration indications for each meter for classifying each of the meters of the set as being within a predetermined set of registration ranges or as being outside said predetermined set of registration ranges.

2. Apparatus as in claim 1 wherein said means for causing the motor to operate at a successive plurality of steady-state speeds includes a plurality of switches in a motor control circuit, and a means coupled with the piston and moving therewith for selectively opening and closing said switches in a predetermined sequence.

3. Apparatus as in claim 2 wherein said switches include means for closing a circuit when acted upon by a magnetic field exceeding a predetermined magnitude, and wherein said means for selectively opening and closing said switches includes a magnet affixed on a shaft connecting said lead screw and said piston and moving with the piston.

4. Apparatus for calibrating a set of liquid flow meters including at least one liquid flow meter, comprising:
   a. means for establishing and maintaining liquid flow through said set of meters in a selective succession of flow rates different from each other;
   b. means responsive to each of the meters in the set for generating a separate indication of the registration of each meter at each of said succession of flow rates comprising: means for generating a series of meter signals at a rate proportional to the flow rate detected by the meter; means for defining, at each flow rate, a fixed time interval, each of said time intervals corresponding to an identical volume of flow through the meter; and means for accumulating a separate count of said meter signals for each of said time intervals, each such count being indicative of the meter registration at one of said flow rates; and
   c. means responsive to the plurality of separate registration indications for each meter for classifying each of the meters of the set as being within a predetermined set of registration ranges or as being outside said predetermined set of registration ranges.

5. Apparatus as in claim 4, including means for displaying at least one of said separate counts.

6. Apparatus as in claim 4 wherein said means for generating meter signals includes means for generating said signals at a preselected frequency resulting in an accumulated count which is a whole number multiple of the percentage registration of the meter.

7. Apparatus as in claim 4 wherein said means responsive to the plurality of separate registration indications includes, for each meter:
   a. means, coupled with said means for accumulating a separate count of said meter signals, for detecting at each flow rate the occurrence of one or more preselected counts of meter pulses; and
   b. means responsive to the detection of preselected combinations of counts for classifying the meter as being within a predetermined set of registration ranges or as being outside said set of registration ranges.

8. Apparatus as in claim 7 wherein said means for detecting at each flow rate the occurrence of preselected counts of meter pulses includes a ring counter for each flow rate, means for triggering said ring counters to their next higher state at the occurrence of each of said preselected counts of meter pulses, and wherein said means for classifying the meter includes a plurality of gates for generating an output signal at preselected combinations of states of said ring counters, said output signal indicating whether a meter is acceptable.

9. Apparatus for calibrating a set of liquid flow meters including at least one liquid flow meter, comprising:
   a. means for establishing and maintaining liquid flow through said set of meters in a selective succession of flow rates different from each other;
   b. means responsive to each of the meters in the set for generating a separate indication of the registration of each meter at each of said succession of flow rates; and
   c. means responsive to the plurality of separate registration indications for each meter for classifying each of the meters of the set as being within a predetermined set of registration ranges or as being outside said predetermined set of registration ranges said last-mentioned means comprising: means for detecting a plurality of preselected registration indications at each flow rate; and means responsive to the detection of certain combinations of said preselected registration indications for classifying the meter as being within a predetermined set of registration ranges or as being outside said predetermined set of registration ranges.

10. Method of testing and calibrating a set of fluid flow meters comprising at least one meter, comprising the steps of:
    a. establishing and maintaining fluid flow through said set of meters in a selective succession of flow rates different from each other;
    b. generating a separate indication of the registration of each meter at each of said succession of flow rates;
    c. determining, for each meter of the set, and for each of said succession of flow rates, if each of the indicated registrations is within a predetermined registration range; and
    d. classifying the meters having each of the indicated registrations within said predetermined registration ranges as accepted, and classifying the meters with one or more indicated registrations outside the predetermined registration ranges as rejected.

11. Method as in claim 10 including selecting, for at least one of said succession of flow rates, one of a plurality of different gear ratios for bringing the meter registration closest to, but not above, the upper limit of a predetermined registration range.

12. Method as in claim 11 including determining, at each flow rate subsequent to the selection of a gear ratio, a corrected predetermined registration range for that flow rate.

13. Apparatus for calibrating liquid flow meters in a set comprising at least one meter, comprising:
    a. means for defining a time interval during which a standard volume of test liquid passes through said set of meters, said means including
        i. a hydraulic cylinder connected in series with said set of meters and having a tightly fitting moveable piston,
        ii. means for moving the piston along a unidirectional path inside the cylinder,
        iii. means for generating a series of master signals, one master signal for each displacement of the piston over a specified increment along its path inside the cylinder,
        iv. counting means for accumulating a count of said master signals, v. control means for generating an initiating signal to cause said counting means to begin accumulating a count of said master signals and for generating a stop signal upon the accumulation of a preselected count, the time interval between said initiating and stop signals being the time interval during which a standard volume of test liquid passes through said set of meters;

b. means responsive to each of the meters in the set for generating a separate indication of the registration of each meter in response to said standard volume of test liquid; and c. means responsive to the plurality of separate registration indications for each meter for classifying each of the meters of the set as being within predetermined registration ranges or as being outside said predetermined registration ranges.

* * * * *

UNITED STATES PATENT OFFICE
CERTIFICATE OF CORRECTION

Patent No. 3,631,709                    Dated January 4, 1972

Inventor(s) Edward C. Smith and Carl P. Kimball

It is certified that error appears in the above-identified patent and that said Letters Patent are hereby corrected as shown below:

Column 2, line 20, "pulses" should read -- pulsers -- ;

line 38, "registration" should read -- rejection --.

Column 9, line 46, "calculation" should read -- accumulating --.

Column 11, line 1, "calculating" should read -- accumulating -- ;

line 4, "present" should read -- pre-set --.

Signed and sealed this 19th day of September 1972.

(SEAL)
Attest:

EDWARD M. FLETCHER, JR.
Attesting Officer

ROBERT GOTTSCHALK
Commissioner of Patents